United States Patent [19]

Sydansk et al.

[11] 4,433,728

[45] * Feb. 28, 1984

[54] PROCESS FOR SELECTIVELY REDUCING THE FLUID INJECTION RATE OR PRODUCTION RATE OF A WELL

[75] Inventors: Robert D. Sydansk, Littleton, Colo.; Paul R. Gucwa, Green Brae, Calif.

[73] Assignee: Marathon Oil Company, Findlay, Ohio

[ * ] Notice: The portion of the term of this patent subsequent to Sep. 8, 1998 has been disclaimed.

[21] Appl. No.: 295,962

[22] Filed: Aug. 25, 1981

Related U.S. Application Data

[63] Continuation-in-part of Ser. No. 164,619, Jun. 30, 1980, Pat. No. 4,287,951.

[51] Int. Cl.$^3$ .................. E21B 33/138; E21B 43/22
[52] U.S. Cl. ......................... 166/270; 166/281; 166/292
[58] Field of Search ............... 166/263, 270, 273, 274, 166/281, 292, 300, 305 R; 405/263

[56] References Cited

U.S. PATENT DOCUMENTS

| | | | |
|---|---|---|---|
| 2,238,930 | 4/1941 | Chamberlin et al. | 166/300 X |
| 2,272,672 | 2/1942 | Kennedy | 166/292 X |
| 2,402,588 | 6/1946 | Andresen | 166/270 |
| 2,693,857 | 11/1954 | Marshall | 166/292 |
| 2,747,670 | 5/1956 | King et al. | 166/270 |
| 2,837,163 | 6/1958 | Ramos et al. | 166/292 X |
| 2,990,881 | 7/1961 | Nathan et al. | 166/292 |
| 3,141,501 | 7/1964 | Bernard et al. | 166/292 X |
| 3,289,759 | 12/1966 | Fisher | 166/270 |
| 3,530,937 | 9/1970 | Bernard | 166/270 |
| 3,658,131 | 4/1972 | Biles | 166/292 |
| 3,805,893 | 4/1974 | Sarem | 166/270 |
| 3,815,681 | 6/1974 | Richardson | 166/292 X |
| 3,837,400 | 9/1974 | Martin | 166/292 X |
| 3,871,452 | 3/1975 | Sarem | 166/270 |
| 3,938,590 | 2/1976 | Redford et al. | 166/270 |
| 4,287,951 | 9/1981 | Sydansk | 166/292 X |
| 4,343,363 | 8/1982 | Norton et al. | 166/300 X |

*Primary Examiner*—George A. Suchfield
*Attorney, Agent, or Firm*—Jack L. Hummel

[57] ABSTRACT

A process for improving areal conformance of fluids injected into or produced from a subterranean formation via a multiwell system wherein significantly greater amounts of fluid than desired are injected into or produced from at least one well of the multiwell system than from other wells of the system. An aqueous caustic solution and an aqueous solution containing a polyvalent cation dissolved therein are caused to mix in the near well bore environment of said at least one well thereby forming an insoluble precipitate which reduces the permeability of the near well bore environment over substantially the entire well bore interval.

9 Claims, No Drawings

PROCESS FOR SELECTIVELY REDUCING THE FLUID INJECTION RATE OR PRODUCTION RATE OF A WELL

CROSS REFERENCE TO RELATED APPLICATIONS

This application is a continuation-in-part of our copending U.S. patent application Ser. No. 164,619, filed June 30, 1980, now U.S. Pat. No. 4,287,951.

TECHNICAL FIELD

The present invention relates to a process for selectively reducing the fluid injection rate or production rate of a well, and more particularly, to a process for selectively reducing the fluid injection rate and/or production rate of one or more wells which are components of a multiwell system so as to improve areal conformance of fluids injected into or produced from the multiwell system, and thus increase hydrocarbon recovery from a subterranean formation.

BACKGROUND ART

Often a plurality of wells penetrating and in fluid communication with a subterranean hydrocarbon-bearing formation are utilized to inject fluids into and/or produce fluids, including hydrocarbons, from a portion of the formation or the entire formation. In this manner, areal conformance of the fluids injected into or produced from the formation can be improved thereby increasing hydrocarbon recovery. Where a portion of the subterranean formation is being produced, these wells can be arranged in conventional linear, 5-spot, 7-spot, etc., patterns, or arrays, or where an entire formation is to be produced, the plurality of wells can be arranged in, for example, concentric ring patterns or arrays. Ideally, if fluid could be injected into all designated injection wells of such a multiwell system at rates which would result in uniform or balanced flood fronts and/or if fluids could be produced from all designated production wells of a multiwell system at rates which would maintain a uniform or balanced flood front, the areal conformance of fluids injected into and/or produced from a subterranean formation would be maximized. In actuality, one or more injection wells are characterized by a significantly greater fluid injection rate than other designated injection wells of multiwell system, and/or one or more production wells are characterized by a significantly greater fluid production rate than other designated production wells of a multiwell system resulting in relatively poor areal conformance of fluids injected into and/or produced from the formation.

Prior art attempts to reduce the fluid injection rate or production rate of certain wells of a multiwell system in order to improve areal conformance of fluids injected into or produced from a subterranean formation have been relatively unsuccessful. One prior art approach involves the injection of well cement into an injection or production well to reduce the injection rate into or production rate from the well. However, as placement of the cement is extremely difficult to control, such approach often results in either plugging only a portion of the entire well bore interval over which fluid can be injected into or produced from the formation, or in entirely terminating or shutting off flow of fluids into or from the well bore. Other prior art attempts have employed aqueous fluids having reactive species dissolved therein which are sequentially injected into a well bore interposed by an aqueous spacer medium. These fluids eventually penetrate the aqueous spacer and mix at a substantial distance from the well bore. The species dissolved in the sequentially injected aqueous fluids react upon mixing to form a plugging precipitate. However, as radial flow of fluids injected into or produced from a well is predominantly influenced by the near well bore environment, failure of this prior art approach to reduce the permeability of the near well bore environment over the entire well bore interval has resulted in relatively poor areal conformance improvement of fluids injected into or hydrocarbons produced from a subterranean formation via a multiwell system.

Thus, a need exists for a process which selectively and predictably reduces the fluid injection rate or production rate of one or more wells of a multiwell system by effectively reducing the permeability in the near well bore environment so as to improve areal conformance of fluids injected into and/or produced from a subterranean formation via the multiwell system.

DISCLOSURE OF THE INVENTION

The present invention provides a process for improving areal conformance of fluids injected into or produced from a subterranean formation via a multiwell system wherein significantly greater amounts of fluid than required to result in or maintain a substantially uniform flood front are injected into or produced from at least one well of the multiwell system. An aqueous caustic solution and an aqueous solution containing a polyvalent cation dissolved therein are sequentially injected into the near well bore environment of the at least one well and caused to mix in the near well bore environment thereby forming a relatively insoluble precipitate which reduces the permeability of the near well bore environment over substantially the entire well bore interval.

BEST MODE FOR CARRYING OUT THE INVENTION

The present invention relates to a process for selectively reducing the permeability in the near well bore environment and over the entire well bore interval of a well penetrating and in fluid communication with a subterranean formation so as to selectively reduce the fluid injection rate or production rate of the well. Often in a multiwell system wherein at least two wells penetrate and are in fluid communication with a subterranean hydrocarbon bearing formation, appreciably greater amounts of fluid than desired are produced from or injected into one or more wells thus resulting in unsymmetrical and uneven areal conformance of fluids produced from and/or injected into the subterranean formation via the multiwell system. Such poor areal conformance in turn results in inefficient hydrocarbon recovery from the multiwell system irrespective of whether primary, secondary, or tertiary recovery is being employed to produce fluids, including hydrocarbons, from the system. The process of the present invention functions to selectively and predictably reduce the fluid injection rate into or production rate from of at least one well of such a multiwell system so as to improve areal conformance of fluids injected into and/or produced from the hydrocarbon bearing subterranean formation via the multiwell system and increase hydrocarbon recovery therefrom. As utilized throughout this description, the term "multiwell system" in most instances refers to at least three wells penetrating and in fluid communication with a subterranean hydrocarbon-bearing formation wherein one or more wells are utilized to inject fluids into the formation and at least one other well is utilized to produce fluids from the formation. However, where fluids are produced from a subterranean formation utilizing primary recovery forces, a multiwell system can refer to at least two wells penetrating and in fluid communication with the formation, the wells being utilized to produce fluids from the formation.

As utilized throughout this description, the term "near well bore" denotes the area of a subterranean formation surrounding a well bore penetrating the same which exhibits relatively homogeneous horizontal characteristics and wherein mixing between sequentially injected aqueous fluids separated by an aqueous spacer will not readily occur to any substantial degree. Such mixing is dependent upon, inter alia, the volume of the aqueous spacer, the characteristics of the formation (i.e., the number of pore channels present in the formation, the permeability of the formation, and the geometry of the pores and pore throats of the formation), the characteristics of each injected fluid (e.g., the diffusion characteristics of each fluid, the viscosities of each fluid, the concentrations of reactive species in each fluid, and the relative mobilities of each injected fluid), and the injection rates of each injected fluid. Given such dependency, the degree of mixing which will occur at a desired distance from a well bore penetrating a formation can be determined by the skilled artisan. As a general guide, the near well bore environment usually extends a radial distance into the formation of up to about 10 feet from the well bore, and may extend up to about 30 feet or more. As also utilized throughout this description, the term "entire well bore interval" refers to that portion of the well bore which is in fluid communication with the subterranean formation into which fluids can be injected or from which fluids can be produced.

The process of the present invention comprises the sequential injection of two aqueous solutions interposed by an aqueous spacer, each of the aqueous solutions containing separate dissolved species which will react upon mixing to produce a voluminous relatively insoluble precipitate. More specifically, the process of the present invention involves the sequential injection of a first caustic, aqueous solution which is permitted to soak within the portion of the near well bore environment treated, an aqueous spacer, and a second aqueous solution containing a dissolved polyvalent cation.

It has been unexpectedly discovered that by allowing the first caustic, aqueous solution to soak within the near well bore environment of a subterranean sandstone formation, the caustic reacts with the sandstone and a substantial portion of the injected caustic is chromatographically held within the near well bore environment. The subsequently injected caustic is chromatographically held within the near well bore environment. The subsequently injected aqueous solution containing polyvalent cations dissolved therein reacts with the caustic held up in the near well bore environment, resulting in the formation of a precipitate in accordance with the following general reaction, wherein M represents the polyvalent cation:

$$M^{n+} + nOH^- \rightarrow M(OH)_n \tag{1}$$

The resultant precipitate is a highly hydrated and dispersed gel-like solid compound through which fluid flow is not completed prevented, but is greatly reduced. This precipitate is preferentially formed in, and hence, reduces permeability in the near well bore environment of the sandstone formation resulting in reduced injection or production rates for fluid injected into or produced from the near well bore environment. While it is not completely understood exactly why allowing the injected caustic solution of the present invention to soak results in chromatographic hold up of the caustic in the near well bore environment, it is believed that the caustic attacks the sandstone and partially dissolves clay and certain silica minerals present in the sandstone. A silicate precipitate rich in hydroxide groups is formed and partitions to the liquid-rock interface where flow of subsequently injected fluids is not blocked. A substantial portion of the hydroxide ions consumed in forming the silicate precipitate is released during the subsequent injection of the relatively neutral, aqueous solution containing polyvalent ions. Once released, the hydroxyl ions react with polyvalent cations in accordance with general reaction (1) to form a voluminous precipitate.

The caustic utilized in one of the aqueous solutions may be any hydroxide ion generating compound such as, sodium hydroxide, potassium hydroxide, lithium hydroxide or ammonium hydroxide, although sodium hydroxide is preferred for purposes of the present invention. The aqueous spacer employed in the present invention may be any soft water or soft brine which is compatible with the formation. As utilized herein, the term "soft" denotes the absence of any deleterious quantity of polyvalent cations. Any polyvalent cation which can be dissolved in an aqueous solution, for example, calcium or magnesium, may be employed in the other aqueous solution. The polyvalent cation can be incorporated into the solution as a salt, such as, for example, magnesium chloride.

The relative amount of caustic and polyvalent cation employed is dictated by the stoichiometry of general reaction (1). Either the polyvalent cation or caustic can be the limiting reactant, although for purposes of the present invention it is preferred to utilize caustic as the limiting reactant, and hence, employ a stoichiometric excess of polyvalent cations. The concentration of caustic employed in an aqueous solution is determined by the amount of caustic-sandstone interaction desired, i.e., the amount of caustic needed within the near well bore environment to form the amount of precipitate desired upon reacting with polyvalent cations, and can vary from small concentrations, e.g. 0.1 wt.%, up to the saturation level within the solution. It is important to note that caustic can be consumed in peripheral reactions in situ depending upon the mineralogy and lithology of the sandstone formation. For example, any dissolved polyvalent cations, such as, calcium, or minerals, such as, gypsum, anhydrite, and siderite, will neutralize caustic, and thus, impede caustic-sandstone interaction. Thus, the caustic concentration must be sufficient to neutralize such deleterious cations and/or minerals present in the sandstone formation and to form the amount of precipitate desired. A soft aqueous or soft brine preflush can be injected into the sandstone formation to displace deleterious cations from the near well bore environment prior to caustic injection. Preferably, the concentration of polyvalent cation employed in the other aqueous solution is at least the stoichiometric amount required to completely react with the caustic released in the near well bore environment upon injection of the other aqueous solution, with a stoichiometric excess preferably being employed.

In accordance with the present invention, it is critical that the aqueous caustic solution is injected into the reservoir prior to the aqueous spacer slug and the aqueous slug containing polyvalent cations and allowed to soak. The volume of the caustic injected into the near well bore environment is dictated by the depth of treatment desired. Once the depth is determined, the volume of the caustic solution injected is approximately equal to or greater than the pore volume of the portion of the near well bore environment to be treated minus the volume of the residual oil in place. The volume of the caustic solution injected is critical since the injected volume dictates the depth of plugging and thus reduction of fluid flow achieved thereby. The volume of aqueous spacer injected is not critical, although preferably, the volume of aqueous spacer injected should be as small as practical. The lower limit is dictated by that volume necessary to prevent the subsequently injected aqueous solution containing polyvalent cations from mixing with the aqueous caustic solution in the well bore resulting in premature precipitation. The volume of spacer utilized can range up to about five times the volume of aqueous caustic solution injected without substantially affecting the process of the present invention.

The extent of interaction between the injected caustic and the formation sandstone is dependent upon, inter alia, the sandstone mineralogy and lithology, and the surface area of the sandstone, the formation temperature, the caustic concentration injected, and the residence time of the injected caustic within the portion of the near well bore environment treated. Although any subterranean sandstone formation can be treated by the process of the present invention, it is preferred to treat a sandstone formation having a temperature of at least 50° C. and more preferably of at least 75° C. It is critical to the process of the present invention that the injected caustic is allowed to soak within the portion of the near well bore environment treated. The exact residence time of the injected caustic within the formation may vary widely from a few hours, e.g. 2 or 3, to up to 5 days, or more depending on the sandstone formation temperature, mineralogy and lithology. However, a soak period of about 16 to about 24 hours is usually sufficient at formation temperatures in excess of about 75° C.

By utilizing the process of the present invention, the permeability of the near well bore environment of a subterranean hydrocarbon-bearing sandstone formation can be predictably reduced over a relatively wide range, preferably utilizing caustic as the limiting reactant. The process of the present invention is preferentially employed to selectively reduce the permeabillity of the near well bore environment of a subterranean hydrocarbon bearing formation over substantially the entire well bore interval of a well penetrating and in fluid communication with the formation so as to selectively reduce the fluid injection rate or production rate of the well and improve areal conformance of fluids injected into or produced from a multiwell system.

The following examples are illustrative of the application of the process of the present invention and are not to be construed as limiting the scope thereof.

EXAMPLE 1

A 7.6 cm×2.5 cm diameter linear, unfired, homogeneous Berea sandstone plug having an initial permeability of 460 md is sequentially injected with a 3 wt.% NaCl solution, a caustic solution, a water spacer, a polyvalent cation solution and finally a 3 wt.% NaCl solution. The injected fluids and the plug are maintained at 85° C. by a heat exchanger. The fluid permeability of the plug after this sequential injection treatment is measured and compared with the initial permeability. No caustic soak period is utilized. The results are set forth in Table 1.

TABLE 1

| Fluid | Pore Volumes Injected | Permeability (k) (md) | k/final k/initial |
|---|---|---|---|
| 3.0 wt. % NaCl | | 460 | |
| 4.0 wt. % NaOH in 3.0 wt. % NaCl | 0.25 | | |
| 2.0 wt. % CaCl$_2$ in 3.0 wt. % NaCl | 0.25 | | |
| 3.0 wt. % NaCl | | 440 | 0.96 |
| Second Sequence | | | |
| 4.0 wt. % NaOH in 3.0 wt. % NaCl | 0.33 | | |
| 3.0 wt. % NaCl | 0.17 | | |
| 2.0 wt. % CaCl$_2$ in 3.0 wt % NaCl | 0.25 | | |
| 3.0 wt. % NaCl | | 480 | 1.09 |

The permeability reduction achieved by this treatment is not large enough ($k_{final}/k_{initial}=0.96$) to significantly reduce fluid injection rates or production rates and thus improve areal conformance. As indicated in Table 1, the same plug was injected with a second sequence of caustic solution, aqueous spacer and polyvalent cation solution in an attempt to further reduce the permeability of the plug. Again, this injection sequence is employed without a caustic soak period. The second sequence actually increases the permeability of the plug.

Example 1 illustrates the failure of prior art processes utilizing an aqueous spacer slug between an aqueous solution containing caustic and an aqueous solution containing a species reactive therewith to reduce the permeability in the environment near a well bore. The caustic residence time within the near well bore environment of such processes is not appreciable enough to permit significant interaction with formation sandstone.

EXAMPLE 2

A 7.6 cm×2.5 cm diameter linear, unfired, homogeneous Berea sandstone plug having an initial permeability of 660 md is sequentially injected with 1.0 pore volume of a 30 wt.% NaOH solution, a 0.30 pore volume brine spacer (3 wt.% NaCl solution), and 1.0 pore volume of a 10 wt.% MgCl$_2$ solution. The injected fluids and the plug are maintained at 85° C. by a heat exhanger. The residence time of the NaOH solution within the plug is approximately 16 hours. The aqueous permeability of the plug after treatment is measured and is compared with the initial aqueous mobility ($k_{final}/k_{initial}$). The aqueous permeability is reduced to $k_{final}/k_{initial}=0.036$.

EXAMPLE 3

A 2.5 cm×2.5 cm diameter, homogeneous sandstone plug from an Oligocene aged reservoir having a residual oil saturation and an initial permeability of 178 md is sequentially injected with 1.0 pore volume of a 15 wt.% NaOH in 3 wt.% NaCl solution, a 0.70 pore volume brine spacer (a 3 wt.% NaCl solution), and 1.0 pore volume of a 3 wt.% MgCl$_2$ in 3 wt.% NaCl solution. The injected fluids and plug are maintained at 85° C. by a heat exchanger. The residence time of the NaOH solution within the plug is approximately 16 hours. The fluid permeability of the plug after treatment is measured and compared with the initial permeability ($k_{final}/k_{initial}$). The fluid permability is reduced $k_{final}/k_{initial} = 0.068$.

EXAMPLE 4

A 2.5 cm×2.5 cm diameter, homogeneous sandstone plug from an Oligocene aged reservoir having a residual oil saturation and an initial gas permeability of 24 md is sequentially injected at approximately 77 ft./day with 1.0 pore volume of a 15 wt.% NaOH in 3 wt.% NaCl solution, a 0.70 pore volume brine spacer (a 3 wt.% NaCl solution), and a 1.0 pore volume of a 3 wt.% MgCl$_2$ in 3 wt.% NaCl solution. The injected fluids and plug are maintained at 85° C. by a heat exchanger. The residence time of the NaOH solution within the plug is approximately 16 hours. The aqueous permeability of the plug after treatment is measured and compared with the initial aqueous permeability ($k_{final}/k_{initial}$). The aqueous permeability is reduced to $k_{final}/k_{initial} = 0.077$.

As indicated in Examples 2, 3 and 4, allowing the initially injected caustic solution to reside within the formation for an appreciable time period prior to injecting the aqueous spacer and polyvalent cation containing solution unexpectedly results in the formation of relatively insoluble precipitates in the near well bore environment. These precipitates substantially reduce injection or production rate of fluids injected into or produced from, respectively, the near well bore environment.

Repeated applications of the sequential injection treatment of the present invention will further reduce the permeability of the near well bore environment and thus the fluid mobility therethrough. The present invention is most advantageously applied to subterranean sandstone formations having a relatively high clay content or a relatively large amount of silica minerals having high surface area.

It is important to note that the permeability reduction effects of the process of the present invention can be reversed by the application of a mineral acid, such as, hydrochloric acid. Ammonium chloride which is inexpensive and readily available can also be employed in solution to dissolve the precipitate.

As thus described, the process of the present invention can be applied to selected wells of a multiwell system to reduce the injection or production rates of each well selected over the entire well bore interval thereof and by so doing, improve the areal conformance of fluids injected into or produced from the multiwell system. The process of the present invention can be most advantageously applied to a given well by averaging the permeabilities over the entire well bore interval and treating the well based upon this average permeability.

While the foregoing preferred embodiment of the invention has been described and shown, it is understood that all alternatives and modifications, such as those suggested, and others may be made thereto, and fall within the scope of the invention.

We claim:

1. A process for improving areal conformance of fluids injected into or produced from a subterranean sandstone formation via a multiwell system, the multiwell system having at least one well wherein appreciably greater amounts of fluid than required to result in or maintain a substantially uniform flood front are injected into or produced from the at least one well than other wells of the multiwell system, the at least one well having a well bore penetrating and in fluid communication with the formation which has a near well bore environment, the process comprising:

injecting into said near well bore environment via said well bore a caustic aqueous solution, having caustic dissolved therein;

shutting in said well bore for a period of time sufficient to allow said caustic to interact with said sandstone formation thereby resulting in at least a portion of said caustic being held within said near well bore environment;

injection into said near well bore environment an aqueous spacer slug; and thereafter, injection into said near well bore environment via said well bore a polyvalent cation containing solution having a polyvalent cation dissolved therein that is reactive with said caustic, permitting said polyvalent cation to react with said at least a portion of said caustic to form an insoluble precipitate in said near well bore environment of the formation over substantially the entire well bore interval, said precipitate reducing the permeability of said near well bore environment over substantially the entire well bore interval.

2. The process of claim 1 wherein said caustic is sodium hydroxide.

3. The process of claim 1 wherein said polyvalent cation is magnesium.

4. The process of claim 3 wherein said caustic is sodium hydroxide.

5. The process of claim 1 wherein the volume of said caustic solution which is injected into said near well bore environment is about equal to the pore volume of said near well bore environment minus the volume of the residual oil contained in said near well bore environment.

6. The process of claim 1 wherein said subterranean formation is subterranean hydrocarbon-bearing formation.

7. The process of claim 1 wherein said aqueous spacer slug is soft water.

8. The process of claim 1 wherein the volume of said aqueous spacer slug which is injected into said near well bore environment is sufficient to prevent formation of said precipitate within said well bore.

9. The process of claim 1 wherein said period of time is at least 16 hours.

* * * * *